United States Patent
Segeren

(10) Patent No.: US 6,269,291 B1
(45) Date of Patent: Jul. 31, 2001

(54) SYSTEM AND METHOD FOR CONTROLLING OF VEHICLES

(75) Inventor: Patrick Hubertus Franciscus Segeren, Rotterdam (NL)

(73) Assignee: Frog Navigation Systems B.V. (NL)

( * ) Notice: Subject to any disclaimer, the term of this patent is extended or adjusted under 35 U.S.C. 154(b) by 0 days.

(21) Appl. No.: 09/485,040

(22) PCT Filed: Aug. 4, 1998

(86) PCT No.: PCT/NL98/00450

§ 371 Date: Mar. 27, 2000

§ 102(e) Date: Mar. 27, 2000

(87) PCT Pub. No.: WO99/06898

PCT Pub. Date: Feb. 11, 1999

(30) Foreign Application Priority Data

Aug. 4, 1997 (NL) .................................................. 1006710

(51) Int. Cl.[7] ..................................................... G06F 15/50
(52) U.S. Cl. .................................. 701/25; 701/24; 701/26
(58) Field of Search ................................. 701/25, 26, 27, 701/24, 23, 202; 180/167, 168, 169

(56) References Cited

U.S. PATENT DOCUMENTS

| 4,847,773 | 7/1989 | van Helsdingen et al. . |
| 4,956,777 | 9/1990 | Cearley et al. . |
| 4,974,259 | 11/1990 | Takahashi et al. . |
| 5,155,683 | * 10/1992 | Rahm ...................................... 701/25 |
| 5,369,591 | 11/1994 | Broxmeyer . |
| 5,377,106 | * 12/1994 | Drank et al. ............................ 701/25 |
| 5,925,080 | * 7/1999 | Shimbara et al. ...................... 701/25 |

FOREIGN PATENT DOCUMENTS

| 4013168 A1 | 10/1990 | (DE) . |
| 0482424 A1 | 4/1992 | (EP) . |
| 363044210 | * 2/1988 | (JP) ....................................... 701/26 |
| WO 9521405 | 10/1995 | (WO) . |

* cited by examiner

Primary Examiner—Richard M. Camby
(74) Attorney, Agent, or Firm—Needle & Rosenberg, P.C.

(57) ABSTRACT

The invention relates to a system for simultaneously navigating two or more vehicles over a surface of relatively limited dimensions at relatively high speed and/or densities of the vehicles. A central control unit has a computer with memory and a transmitter/receiver for communication with each of the vehicles. Marker elements are arranged on or above the surface and mark the position relative to the surface. The two or more vehicles have drive elements, steering elements, navigational devices, transmitter/receivers and sensor means for sensing the position relative to the markers. The central control unit uses time as well as the sensed position in controlling the vehicles on the surface to precisely control the traffic.

15 Claims, 1 Drawing Sheet

SYSTEM AND METHOD FOR CONTROLLING OF VEHICLES

Figure 1:
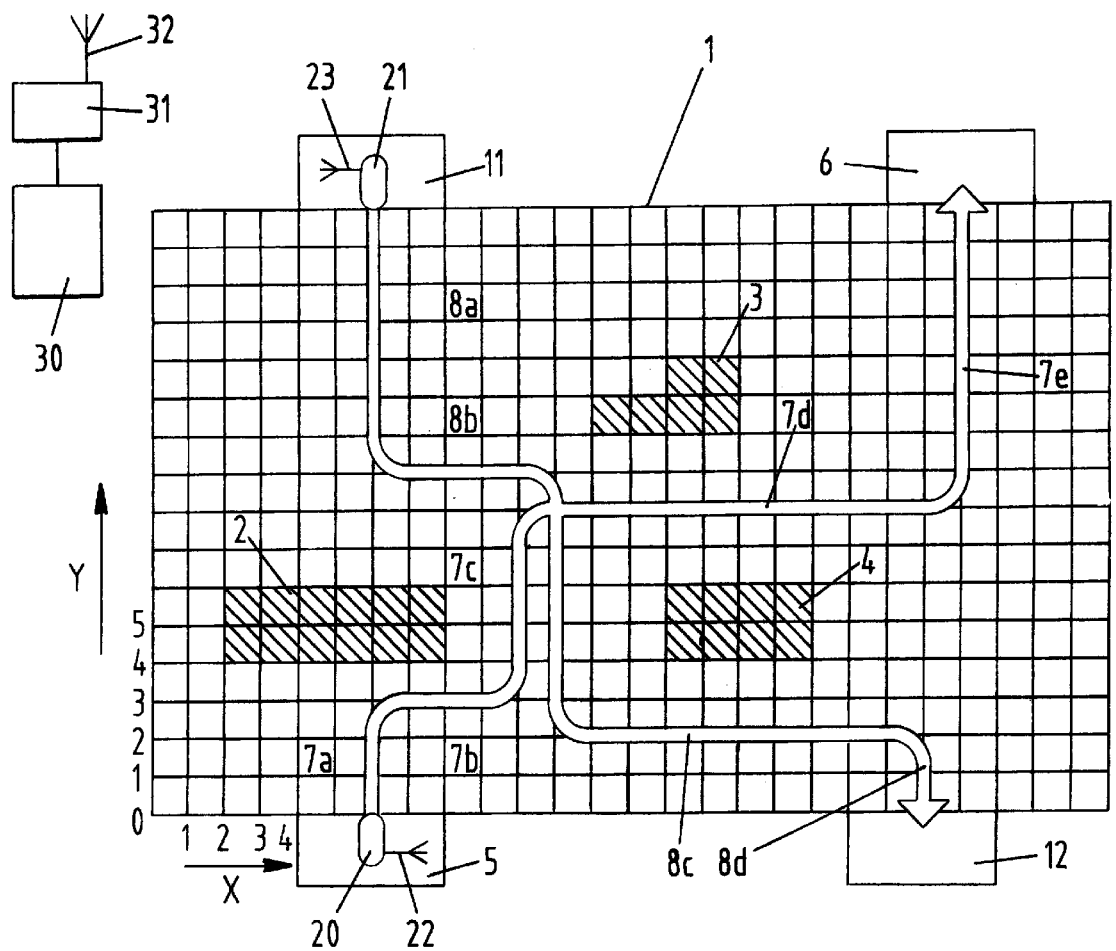

Applicant markets many control system applications for automatically controlled vehicles which vary from unmanned transport of containers in a dockyard to the transport of components in a factory building and driverless transport of passengers, for instance between a parking place and the passenger terminal of an airport.

The known system of applicant, which is described inter alia in the American patent specification U.S. Pat. No. 4,847,773, makes it possible to navigate a vehicle in accurate manner. Major modifications to the system are prevented even after particular obstacles on the surface have been moved. Using computer means a new path for the vehicle can be simply computed each time on board the vehicle or from a central point.

At higher speed or a greater number of vehicles within a determined area problems occur with respect to the response speed of this existing system, particularly when frequent communication with a central control unit must take place. The area can be divided into sectors in order to enable control of the traffic. If two vehicles require to travel through the same sector, the first vehicle has for instance to have been driven wholly through this sector before the second vehicle can enter it. Communication with a central control unit must take place each time in time-consuming manner in order to obtain permission to enter a section. Also in the case of transport by passenger vehicles, for instance at high speed in a limited space, wherein the route to be travelled by the vehicle is determined centrally from the central control unit to the vehicles, it is important to increase the accuracy of the position of each vehicle at any desired point in time.

It has further been found impractical for a new vehicle, or a vehicle left stranded in the area due to breakdown, to have to be initialized manually.

The present invention provides a system for simultaneously navigating two or more vehicles over a surface of relatively limited dimensions at relatively high speed and/or density of these vehicles, comprising:

- a central control unit at least provided with a computer with memory and a transmitter/receiver for communication with each of the vehicles;
- marker elements which are arranged on or above the surface and which mark a position relative to the surface; and
- two or more vehicles which are each provided with drive means for driving the vehicle, steering means for steering thereof, navigation means for plotting a route, a transmitter/receiver for communication with the central control unit and sensor means for sensing the position relative to the marker elements;
- wherein the vehicles move over the surface in the same time period along possibly colliding routes and wherein the position and speed of the vehicles is predetermined precisely in time relative to the marker elements and is maintained accurately relative to the marker elements during travel such that the effort required in respect of traffic control and/or communication with the central control unit and/or with another vehicle can be reduced considerably.

The route planner of the central control unit uses time as an extra dimension: a route n consists of a set of occupied points Rn(x,y,t). When calculating route n+1 the planner must therefore also take into account the occupied points R1(x,y,t) to Rn(x,y,t) in addition to the fixed obstacles o(x,y).

Subject to the application, different methods are possible. One possible method is based on pre-calculating all routes for all vehicles by the central coordinating computer. The vehicles will then travel in accordance with the pre-determined "scenario". Two very different examples of this method are: 1) cars with passengers which move criss-cross relative to each other in a surprising manner (amusement industry) and 2) unmanned vehicles which travel according to a pre-determined 'timetable'.

Another method is applicable when the transport assignment is not known beforehand. In this case, as soon as a transport assignment is received, the central computer will determine a route which takes into account all routes which are still being implemented at that moment. An example hereof is automatic landing and removal of containers during loading and offloading of container ships. Unmanned container carriers herein travel over the quay between ship and storage area via routes which can mutually intersect at many points.

In the system according to the present invention congestion and delay are avoided as far as possible in that via interaction of the vehicle with the marker elements it is determined in each case whether the vehicle passes a determined position on the surface at the correct point in time. Should deviations threaten to occur, the drive means are actuated in order to cause the vehicle to travel faster/slower depending on the deviation.

The marker elements can be laser beacons or, in a quite different application, satellites for instance for GPS, but in the preferred embodiment of the present invention are magnets, transponders or colour transitions or material transitions which are linear and which are arranged at regular intervals in the surface. The advantages hereof are relative simplicity of arranging such elements and the inexpensive sensor means required on board the vehicle.

In a further preferred embodiment of the invention, use is made of transponders which are arranged in the surface, optionally in addition to other marker elements, in order to make it easier for vehicles to be taken up into the system again after standstill or breakdown. For this purpose the vehicle is, or the sensor means are, embodied such that within the surface covered by the vehicle when it is stationary the sensor means can scan a number of transponders. The transponders each have a different response characteristic, or a different number, so that the vehicle can determine its position and orientation on the basis of a number of received responses.

Figure 2:
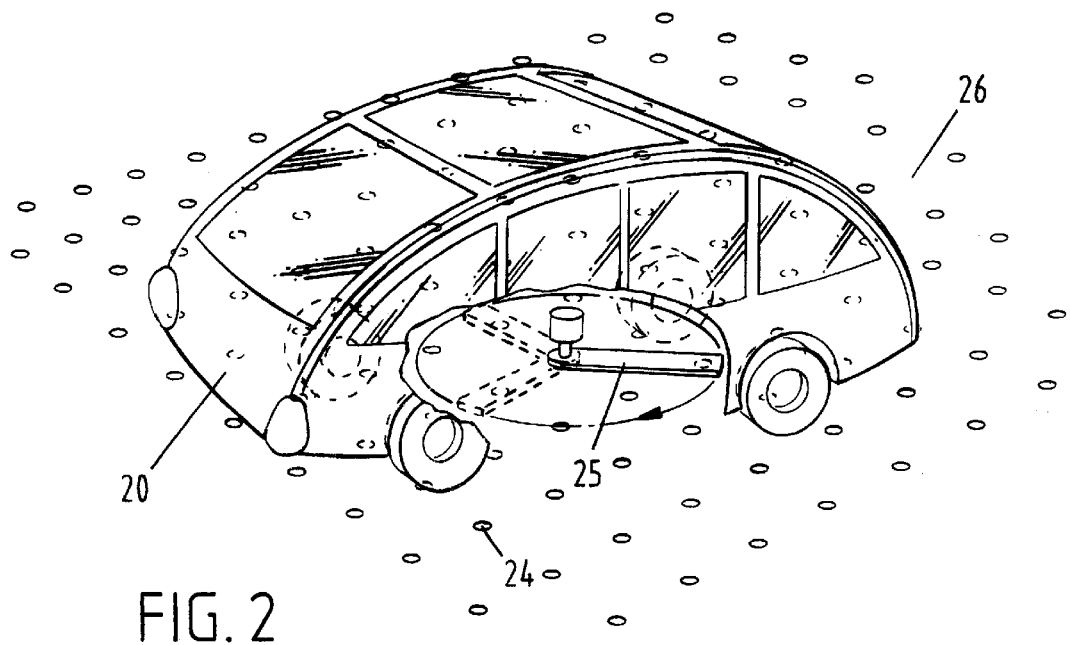

Further advantages, features and details of the present invention will be elucidated on the basis of the following description with reference to the annexed drawings, which show schematically the system and method according to the present invention and in which:

FIG. 1 shows a schematic top view of a travel plan for two vehicles with colliding routes, wherein a preferred embodiment of the system according to the present invention is used; and FIG. 2 shows a view in perspective of a preferred embodiment of a vehicle according to the present invention.

A first vehicle 20 provided with an antenna 22 must be navigated in a coordinate system $X_1, X_2 \ldots, Y_1, Y_2 \ldots$ from a starting station 5 to an end station 6 via line sections 7a, 7b, 7c, 7d and 7e. Situated in the area are obstacles 2, 3 and 4, the positions of which are known in a central control unit 30 which is provided with a transmitter/receiver 31 with antenna 32. The route of the vehicle 20 is calculated or planned either in the vehicle or in central control unit 30. In the present case this resulted in the route according to the above designated line sections.

In area 1 a vehicle 21 must also be navigated from a station 11 to a station 12. Calculations performed either in vehicle 21 (provided with antenna 23 for communication with control unit 30) or in the computer of control unit 30 provide for instance a route according to line section 8a, 8b, 8c and 8d, which intersects route 7.

Area 1 is provided with linear transitions or magnets or transponders on the intersections of the coordinate system X, Y. By determining at each passage along a transponder or magnet whether the time of passage corresponds to the time of passage anticipated according to the planning, correct planning can prevent vehicles 20 and 21 simultaneously passing over route section 7c in different directions. Traffic regulation and communication hereby become less necessary, which can increase the speed of control and/or vehicles.

The route planning for vehicles 20 and 21 is performed by central control unit 31, which must comprise a powerful computer in the case of a large number of vehicles.

In the system according to the present invention passive transponders are preferably arranged in the surface in addition to passive magnets which are recommended when vehicles travel at high speeds of for instance more than 5 m/s. The transponders each have a different response characteristic and are as it were numbered. In the preferred embodiment the transporters are situated close together such that when the sensor means under the vehicle move or when a substantially round vehicle rotates on its axis, a number of responders are scanned by the sensor means, whereafter the vehicle can transmit its position via the antenna to the central control system, which can then in turn determine via which route the vehicle can continue on its way.

A vehicle 20 (FIG. 2) is preferably provided on its underside with a rotatable antenna designated schematically with 25 which, when turned, covers at least three transponders 26 provided with a code or number, whereby the vehicle can determine its position on initialization by reading the three unique codes in combination with the angles at which the different transponders are detected. The codes correspond to known positions in the ground plan of the working area which is stored in the memory of the vehicle control. The exact position of the centre of the antenna can be derived from the two (or more) mutual angles between the three (or more) detected transponders. The angle between the vehicle axis and one of the transponders then provides the orientation of the vehicles.

The antenna used is preferably embodied as a single elongate loop, but other embodiments can also be envisaged provided that detection of more than one transponder at a time is prevented.

The advantage of such an antenna is that it is not necessary to measure a position directly, this requiring a much more complex antenna and electronics. Because the angle associated with the moment of detection of a transponder is used to determine location, compact standard code-transponders and associated detection systems obtainable as standard can be used. The transponders can have a diameter of 10 mm or less and can consequently be arranged simply and advantageously in the floor.

The present invention is not limited to the above described preferred embodiment thereof, nor to the above described applications. Applications such as cars with people on board which move criss-cross relative to each other in the amusement sector are a future prospect. The rights sought are defined by the following claims, within the scope of which many modifications can be envisaged.

What is claimed is:

1. A system for navigating two or more vehicles over a surface, said system comprising:
   a central control unit at least provided with a computer with memory and a transmitter/receiver for communication with each of the vehicles;
   passive marker elements which are arranged on or above the surface and which mark positions (x, y) relative to the surface; and
   two or more vehicles which are each provided with drive means for driving the vehicle, steering means for steering thereof, navigation means for navigating the vehicle, a transmitter/receiver for communication with the central control unit, and sensor means for sensing the position relative to the marker elements;
   characterized in that said two or more vehicles simultaneously move over the surface of relative limited dimensions at relatively high speed and/or density of these vehicles, wherein the position and speed of the vehicle is predetermined precisely in time relative to the marker elements and is maintained accurately relative to the marker elements during travel, and in that a route planner uses time as an extra dimension for planning, said route planner taking into account the occupied points R1 (x, y, t) to Rn (x, y, t) of the routes R of 1 to n vehicles, in addition to fixed obstacles O (x, y) when calculating route n+1 for vehicle n+1.

2. System according to claim 1, wherein all routes for all vehicles are precalculated by said route planner.

3. System according to claim 1, wherein the route planner determines and implements new routes at a moment of time, when a transport assignment is received from a vehicle by the route planner.

4. System according to claim 1, wherein the marker elements are passive magnets, transponders or optically detectable elements arranged in the surface at regular distances.

5. System according to claim 4, wherein the marker elements have a diameter of 10 mm or less.

6. A system according to claim 1, wherein the sensor means or the vehicle are movable such that a number of numbered marker elements can be scanned by the sensor means, whereby position and orientation of the vehicle are determined.

7. A system according to claim 6, wherein the sensor means comprise a rotatable antenna and the marker elements are transponders, wherein the position of the antenna is derived from two or more angles between three or more detected transponders and the orientation of the vehicle is derived from the angle between the longitudinal axis of the vehicle and one of the transponders.

8. A system according to claim 7, wherein the antenna comprises a substantially elongate loop.

9. A method of navigating two or more vehicles wherein the system as claimed in claim 1 is used.

10. A method as claimed in claim 9, wherein at locations defined by the marker elements it is determined whether the time of passage along that intersection corresponds with the anticipated time of passage.

11. Method as claimed in claim 10, wherein the drive means of the vehicle are actuated if deviations occur between the desired time of passage and the actual time of passage.

12. System according to claim 2, wherein the marker elements are passive magnets, transponders or optically detectable elements arranged in the surface at regular distances.

13. System according to claim 3, wherein the marker elements are passive magnets, transponders or optically detectable elements arranged in the surface at regular distances.

14. A method of navigating two or more vehicles wherein the system as claimed in claim 6 is used.

15. A method of navigating two or more vehicles wherein the system as claimed in claim 7 is used.

* * * * *